(12) United States Patent  (10) Patent No.: US 9,381,845 B2
Miers et al.  (45) Date of Patent: Jul. 5, 2016

(54) LOADING AND UNLOADING APPARATUS FOR TRUCK BEDS

(71) Applicants: Casey Miers, Houston, TX (US); Kristin Miers, Houston, TX (US)

(72) Inventors: Casey Miers, Houston, TX (US); Kristin Miers, Houston, TX (US)

(*) Notice: Subject to any disclaimer, the term of this patent is extended or adjusted under 35 U.S.C. 154(b) by 54 days.

(21) Appl. No.: 14/484,232

(22) Filed: Sep. 11, 2014

(65) Prior Publication Data

US 2015/0083346 A1  Mar. 26, 2015

Related U.S. Application Data

(60) Provisional application No. 61/881,485, filed on Sep. 24, 2013.

(51) Int. Cl.
*B60P 1/00* (2006.01)
*B60P 7/08* (2006.01)
*B65G 7/00* (2006.01)

(52) U.S. Cl.
CPC . *B60P 1/00* (2013.01); *B60P 1/006* (2013.01); *B60P 7/08* (2013.01); *B65G 7/00* (2013.01)

(58) Field of Classification Search
CPC ............... B60P 1/00; B60P 7/08; B60P 7/14; B25J 1/04; B62D 33/02; B65G 7/12; B65G 7/02
See application file for complete search history.

(56) References Cited

U.S. PATENT DOCUMENTS

| | | | |
|---|---|---|---|
| 1,538,464 A | 5/1925 | Chich | |
| 2,512,339 A | 6/1950 | Knapp | |
| 4,685,856 A | 8/1987 | Hesse | |
| 5,314,290 A | 5/1994 | Lutz | |
| D380,706 S | 7/1997 | Gardner | |
| 7,334,825 B1 * | 2/2008 | Sammon | B25H 5/00 294/24 |
| 7,980,608 B2 * | 7/2011 | Pouliot | B65G 7/02 294/15 |
| 8,033,776 B2 | 10/2011 | Calhoun | |
| 2002/0090276 A1 | 7/2002 | Earle | |
| 2010/0034629 A1 * | 2/2010 | Hamann | B60P 1/003 414/462 |

* cited by examiner

*Primary Examiner* — Monica Carter
*Assistant Examiner* — Seahee Yoon
(74) *Attorney, Agent, or Firm* — Buche & Associates, P.C.; John K. Buche; Scott D. Compton

(57) ABSTRACT

Disclosed is an apparatus for moving cargo toward or away from the end of a truck bed. The device includes a cross bar that spans the width of the truck bed. The cross bar comprises a pair of caster wheels that allow the cross bar to travel in the furrows of the truck bed. Each caster wheel is rotatably attached to a plate that is slideably attached to the cross bar by means of a locking mechanism. In this way, the caster wheel can be moved along the width of the cross bar. The cross bar is attached to a telescopic handle that is adapted to lie flat in the furrows of the truck bed. The present invention may further comprise a divider wall that can be removably attached to the handle. The divider wall allows a user to organize the truck bed when carrying cargo.

9 Claims, 5 Drawing Sheets

LOADING AND UNLOADING APPARATUS FOR TRUCK BEDS

CROSS REFERENCE TO RELATED APPLICATION

This application claims the benefit of U.S. Provisional Application No. 61/881,485 filed on Sep. 24, 2013. The above identified patent application is herein incorporated by reference in its entirety to provide continuity of disclosure.

BACKGROUND OF THE INVENTION

1. Field of the Invention

The present invention relates to a labor saving device for loading and unloading cargo from a vehicle. More specifically, the present invention pertains to an improved loading and unloading apparatus for truck beds.

Loading and unloading cargo from a truck bed be can be difficult and time consuming. Generally, loading and unloading cargo from the truck bed requires an individual to climb into the truck bed and place items on the truck bed, or remove the items therefrom. This can be an especially a challenging task for individuals with limited mobility or for individuals with larger, taller trucks. When climbing in and out of the truck bed while carrying heavy cargo, individuals are at a risk of suffering various types of injuries. For instance, carrying cargo in front of the individual can obstruct the individual's view and cause the individual to fall off of the truck bed or trip. Additionally, individuals can strain or sprain a muscle.

Some individuals utilize a step-stool, a ramp, or other similar devices that help individuals climb into and out of truck beds. These devices, however, are inconvenient to use because they require the individual to set up the device so that it is properly supported at the base. Other individuals require assistance from others, but this can be impracticable and inconvenient. Therefore, a device that enables an individual to easily move the cargo toward and away from the individual without requiring the individual to climb into the truck bed is desired.

The present invention is an apparatus for moving cargo from and to the end of a pickup truck bed. The device comprises a cross bar having a pair of caster wheels and bristles that span the width of the cross bar at the leading edge thereof. The device can be easily maneuvered by means of a telescopic handle attached to the cross bar. The cross bar can be placed behind cargo so that the cargo can be moved towards the end of the truck bed when the handle is pulled. Conversely, the cross bar can be placed in front of cargo so that the cargo can be moved away from the end of the truck bed when the handle is pushed. The present invention provides convenience to the user by reducing the time needed to unload cargo from the truck bed and eliminating the need to climb into the truck bed to load and unload cargo, which can cause injury.

Additionally, the present invention comprises a low profile and is configured to lie flat against the truck bed. As such, the present invention may be used to move cargo toward and away from the back of the truck bed without requiring the user to the truck bed cover thereon.

2. Description of the Prior Art

Devices have been disclosed in the prior art that claim apparatuses for moving cargo to the end of a pickup truck bed. These include devices that have been patented and published in patent application publications. Some of these devices disclose the design for a blade that moves cargo to the end of a pickup truck bed. Other devices disclose a gate that slides along the interior of a trailer to move cargo to the end for removal. These devices, however, do not disclose caster wheels/skis that travel in the furrows of the bed or a handle that is attached to the blade. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Design Pat. No. D380706 to Gardner discloses a design for a truck bed insert that allows users to retrieve items that are stored within a truck bed. The device comprises a plate that spans the width of a truck bed. The lower end of the plate rests on a pair of skis that run parallel to the plate. The upper end of the plate comprises a pair of straps that connect to the side of the truck bed at the end. Each strap is connected the truck bed by means of an eye bolt. Each end of the strap comprises a knot thereon to prevent the strap from falling through the eye bolt. Similarly, U.S. Pat. No. 1,538,464 to Chich discloses a wagon unloading device. The device is shaped similarly to a triangular prism with an open side. The device is connected to a rope or a chain so that the device can push cargo from the front of the wagon toward the back of the wagon.

While the devices of Gardner and Chich enable a user to pull the cargo contained within a truck bed or wagon toward the tailgate thereof, these devices are limited in the fact that they do not allow the user to push the cargo toward the front of the truck bed. In contrast, the present invention provides an elongated handle that allows the user to push and pull the cargo in various directions along the length of the truck bed.

U.S. Pat. No. 4,685,856 to Hesse and U.S. Published Patent Application Number 2002/0090276 to Earle disclose gates for a truck bed. Hesse discloses a gate that is pivotally attached to the truck bed. The gate can pivot from a raised position to a lowered position, and vice versa by means of cables. Earle discloses a gate that can slide along the length of the truck bed. The devices of Hesse and Earle, however, are not operable to load or unload cargo from a truck bed. Rather, these gates prevent cargo from shifting about the truck bed or unintentionally exiting the truck bed.

U.S. Pat. No. 8,033,776 to Calhoun discloses a sliding device for moving cargo from the front of a truck bed towards the tailgate where it may be grasped by a user. The device comprises a U-shaped rod that is constructed to fit within the furrows of the truck bed. The U-shaped rod comprises a channel that spans the length there of. The device further comprises an L-shaped rod having a first section that is orthogonal to a second section. The second section is disposed within the channel of the U-shaped rod and can be grasped to manually pull the first section toward the tailgate, thereby unloading the cargo. Similarly, U.S. Pat. No. 2,512,339 to Knapp and U.S. Pat. No. 5,314,290 to Lutz discloses an ejector for unloading cargo from vehicles. These devices generally comprise a plate that is adapted to push cargo toward the back of the vehicle by means of a motor assembly.

The foregoing Calhoun, Knapp, and Lutz devices are directed toward devices for moving cargo from the front of a vehicle towards the back of the vehicle. Thus, these devices are inoperable to load cargo onto the truck bed. Specifically, the second section of the L-shaped rod in Calhoun would prevent the user from closing the tailgate when the first section is behind the cargo because the second section would extend beyond the tailgate. Additionally, the disposition of the motor assembly of Knapp and Lutz would prevent users from placing cargo behind the plate.

The devices disclosed in the prior art have several known drawbacks. The prior art devices are limited in the fact that they are not constructed to allow a user to load and unload cargo from a truck bed. The present invention overcomes these limitations by disclosing a truck bed rake that allows the user to move cargo toward and away from the tailgate. It is therefore submitted that the present invention is substantially divergent in design elements from the prior art, and consequently it is clear that there is a need in the art for an improvement to apparatuses for moving cargo to the end of a pickup truck bed. In this regard, the instant invention substantially fulfills these needs.

SUMMARY OF THE INVENTION

In view of the foregoing disadvantages inherent in the known types of apparatuses for moving cargo to the end of a pickup truck bed now present in the prior art, the present invention provides a new and improved loading and unloading apparatus for truck beds wherein the same can be utilized for moving cargo toward or away from the end of a truck bed.

It is therefore an object of the invention to provide a new and improved loading and unloading apparatus for truck beds that has all of the advantages of the prior art and none of the disadvantages.

Another object of the present invention is to provide a new and improved loading and unloading apparatus for truck beds having an adjustable wheel assembly.

Yet another object of the present invention is to provide a new and improved loading and unloading apparatus for truck beds having bristles on the leading edge of a cross bar.

Still yet another object of the present invention is to provide a new and improved loading and unloading apparatus for truck beds having a telescopic handle, wherein the handle can be adjusted in length for use with truck beds of various lengths.

Still yet another object of the present invention is to provide a new and improved loading and unloading apparatus for truck beds having a divider wall to organize loaded cargo in the truck bed.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
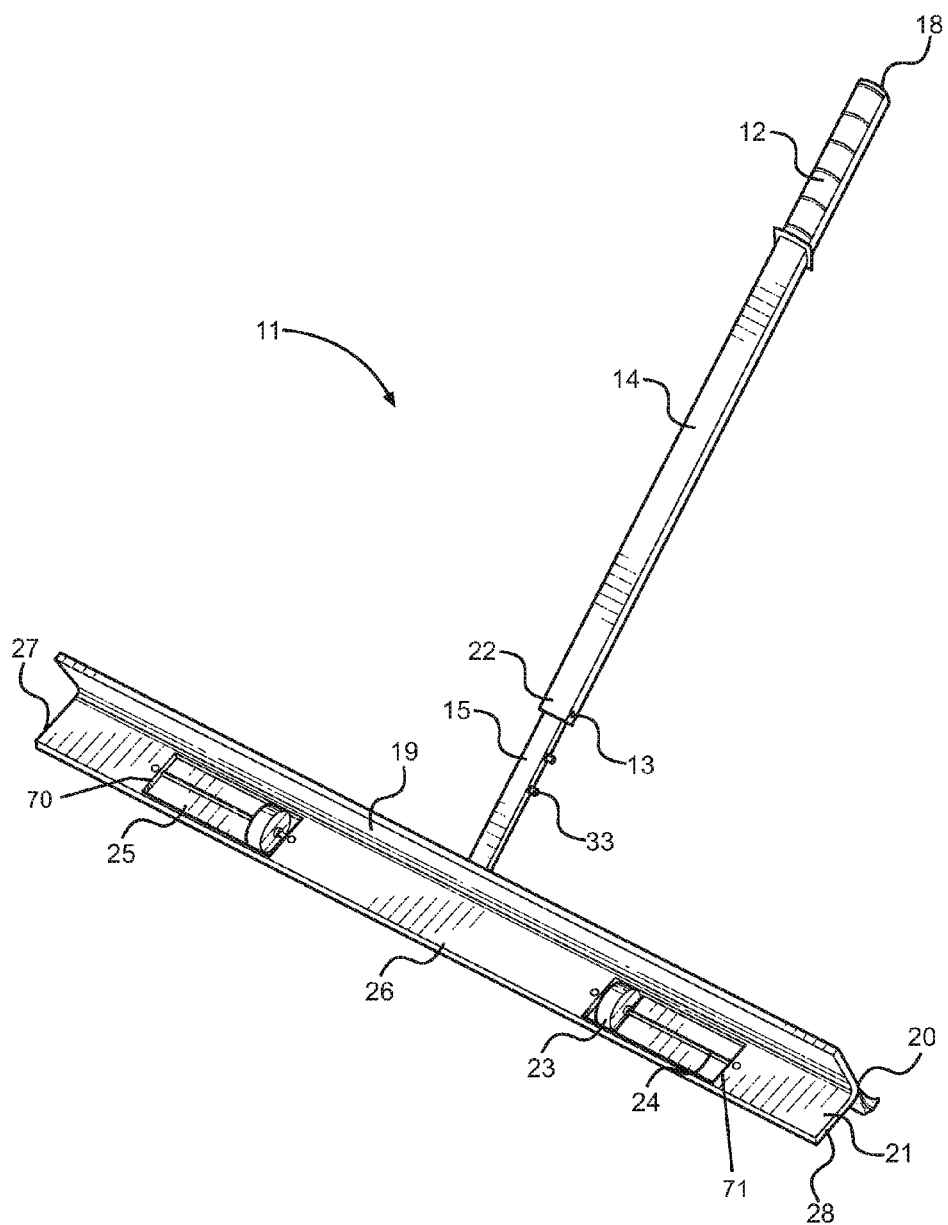
FIG. 1 shows a front perspective view of the present invention.

References are made herein to the attached drawings. Like reference numerals are used throughout the drawings to depict like or similar elements of the loading and unloading apparatus for truck beds. For the purposes of presenting a brief and clear description of the present invention, the preferred embodiment will be discussed as used to move cargo toward or away from the tailgate end of a truck bed. The figures are intended for representative purposes only and should not be considered to be limiting in any respect.

Referring now to FIG. 1, there is shown a front perspective view of the present invention. The loading and unloading apparatus 11 of the present invention comprises a cross bar 21 that is attached to a telescopic handle. The cross bar 21 comprises a first section 19 and a second section 26, wherein the first section 19 is substantially perpendicular to the second section 26. The first section 19 and the second section form an L-shape, defining a leading edge 20. The cross bar 21 comprises a first end 27 and a second end 28, and the distance between the first 27 and second 28 ends defines a width. The width of the cross bar 21 is adapted to span the width of a truck bed.

The first section 19 of the cross bar 21 comprises a handle centrally attached thereto. The handle comprises a first section 14 and a second section 15. Each of the sections 14, 15 comprise a substantially rectangular cross section with a hollow interior volume so that it may lie flat between the furrows of a truck bed. The cross sectional area of the first section 14 is larger than the cross sectional area of the second section 15. As such, the second section 15 can be retracted and extended out of the first end 22 of the first section 14.

The second section 15 comprises a plurality of locking mechanisms 33 at a longitudinal edge thereof. The locking mechanisms 33 are separated at regular intervals and are spring biased so that they can be manually pushed inward and toward the hollow middle portion of the second section 15, and automatically spring back outward. In operation, the locking mechanism 33 can be pushed inward through the aperture 13 near the first end 22 of the first section 14 so that the second section 15 can be retracted or extended. Once at a desired length, the locking mechanism 33 can spring back outwards through the aperture 13 so that the locking mechanism 33 prevents the second section 15 from further retracting or extending. In this way, the user can adjust the length of the handle and secure it at a desired length, thereby allowing the user to utilize the present invention with truck beds of various lengths.

The second end 18 of the first section 14 comprises a gripping portion 12 thereon. The gripping portion 12 is composed of padded material such as foam, rubber, or other suitable material. The gripping portion 12 comprises a rectangular cross section with a hollow middle portion. The gripping portion 12 further comprises an open end and a closed end, wherein the open end is adapted to receive the second end 18 of the first section 14 therein. The closed end of the gripping portion 12 prevents the gripping portion 12 from sliding further along the length of the first section 14.

The second section 26 of the cross bar 21 comprises a pair of rectangular openings 70 and 71, wherein each opening is adapted to hold a caster wheel 23 therein. The caster wheel 23 is rotatably attached to an adjustable plate 25 having a channel 24 thereon. The plate 25 is slideably attached to the bottom surface of the second section 26 so that the wheel 23 is shown through the opening. The plate 25 can slide side to side so as to adjust the position of the caster wheels 23 along the width of the cross bar 21. In this way, the wheels 23 can be positioned to fit in the furrows of a truck bed.

Figure 2A:
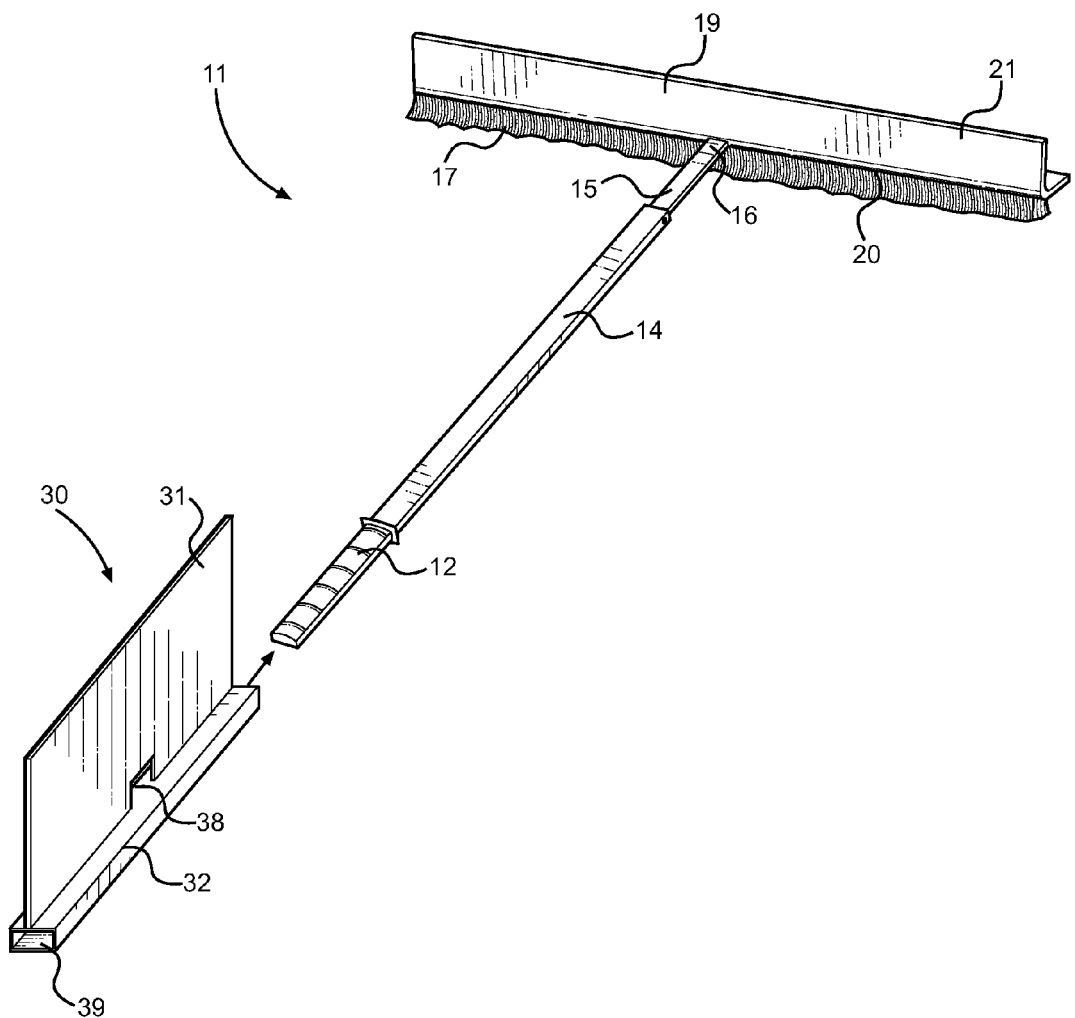
FIG. 2A shows a rear perspective view of the present invention and a divider wall being removably attached thereto in a parallel configuration.
Figure 2B:
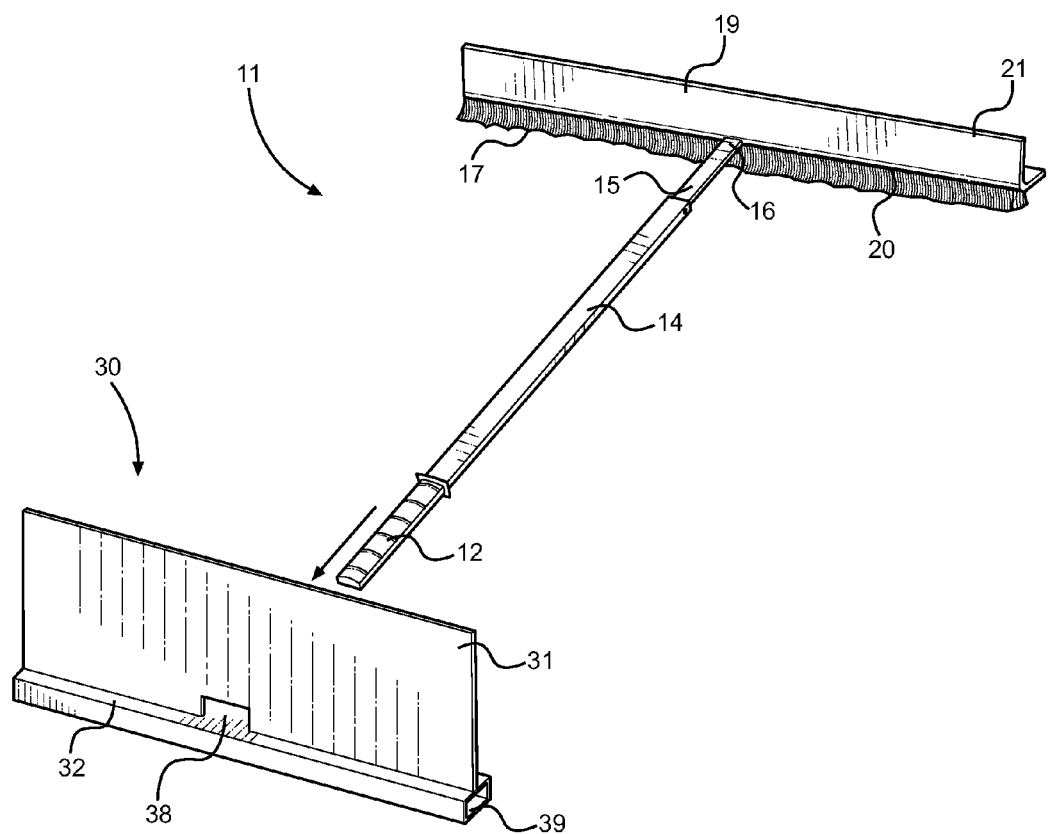
FIG. 2B shows a rear perspective view of the present invention and a divider wall being removably attached thereto in a perpendicular configuration

Referring now to FIGS. 2A and 2B, there are shown rear perspective views of the loading and unloading apparatus 11 of the present invention. The first end 16 of the second section 15 of the handle is attached to a substantial midpoint of the first section 19 of the cross bar 21. The second section 15 may be attached to the first section 19 by means of a fastener or the second section 15 may be welded to the first section 19 so that the cross bar 21 and the second section 15 are unitary in structure. Alternatively, the first end 16 of the second section 15 may comprise externally threaded elements thereon so that it may be screwed into a centrally disposed aperture on the first section 19, wherein the aperture comprises internally threaded elements therein.

The leading edge 20 of the cross bar 21 comprises bristles 17 thereon. In the illustrated embodiment, the bristles 17 span the width of the cross bar 21. The bristles 17 are configured so that the height of the bristles 17 is substantially equal to the radius of the caster wheels. In this way, the second section of the cross bar 21 can remain substantially parallel to the truck bed in which it is placed. The bristles 17 are placed so that they do not interfere with the functionality of the wheels, while allowing the user to sweep smaller items, such as hand tools or ropes that fall within the furrow of a truck bed.

In some embodiments, the present invention may further comprise a divider wall 30 having a panel 31 and a base member 32. The panel 31 is substantially rectangular in shape and comprises a base edge that is centrally attached to an upper surface of the base member 32. The base member 32 comprises a rectangular cross section with a hollow middle portion 39. The cross sectional area of the base member 32 is preferably greater than the cross sectional area of the first section 14 of the handle and the cross sectional area of the grip portion 12. In this way, the grip portion 12 and the first section 14 can be slid through the hollow middle portion 39 of the base member 32 so that the divider wall 30 can be removably secured to the handle in a parallel configuration. Alternatively, the divider wall 30 may be removably secured to the handle in a perpendicular configuration by sliding the handle through an opening 38 disposed on the panel 31. The opening 38 is centrally located on the base edge of the panel 31 and is configured to receive a portion of the handle therethrough. The divider wall 30 can be positioned at any location along the length of the handle. The panel 31 of the divider wall 30 is adapted to organize cargo that is loaded on the truck bed by compartmentalizing the truck bed.

Figure 3:
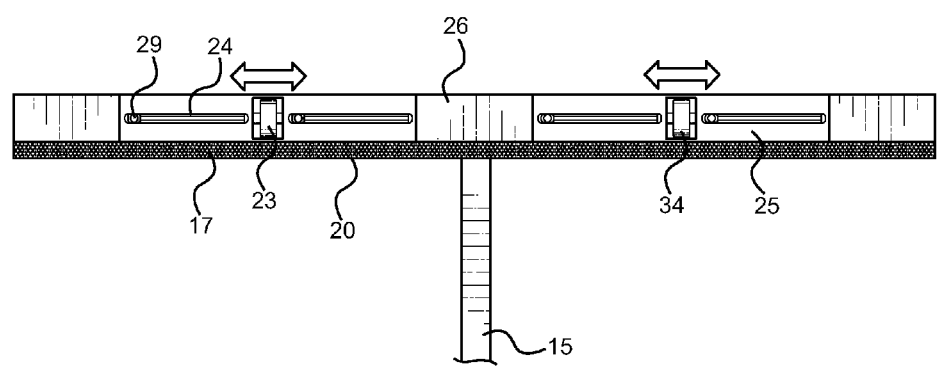
FIG. 3 shows a close up view of the underside of the cross bar of the present invention.

Referring now to FIG. 3, there is shown a close up view of the underside of the cross bar of the present invention. The second section 26 of the cross bar comprises a pair of rectangular openings on opposing sides of the second section 15 of the handle. The second section 26 comprises a pair of plates 25, wherein one plate 25 is slideably attached over each rectangular opening. In this way, the plate 25 can slide side to side while mounted on the second section 26. The plate 25 is rectangular in shape and is dimensioned so that the width of the plate 25 is greater than the width of the rectangular opening, and the height of the plate 25 is equal to the height of the rectangular opening. In this way, the plate 25 does not extend beyond the second section 26 of the cross bar. Additionally, the plate 25 does not interfere with the placement of the bristles 17 along the leading edge 20.

Each of the plate 25 comprises a centrally located wheel opening 34 having a caster wheel 23 therein. The plate 25 further comprises a channel 24 on opposing sides of the wheel opening 34. The channels 24 directly align with one another and are disposed at substantial midpoint of the caster wheel 23. Each channel 24 is adapted to receive a locking mechanism 29, wherein each locking mechanism 29 is affixed to the second section 26, adjacent to the opposing sides of each rectangular opening thereof. The locking mechanism 29 can be loosened or tightened so that the plate 25 can be moved side to side along the width of the second section 26. By sliding the plate 25, the user can change the location of the caster wheel 23 on the second section 26. In this way, the user can position each wheel 23 so that it falls between the furrows of the truck bed.

Figure 4A:
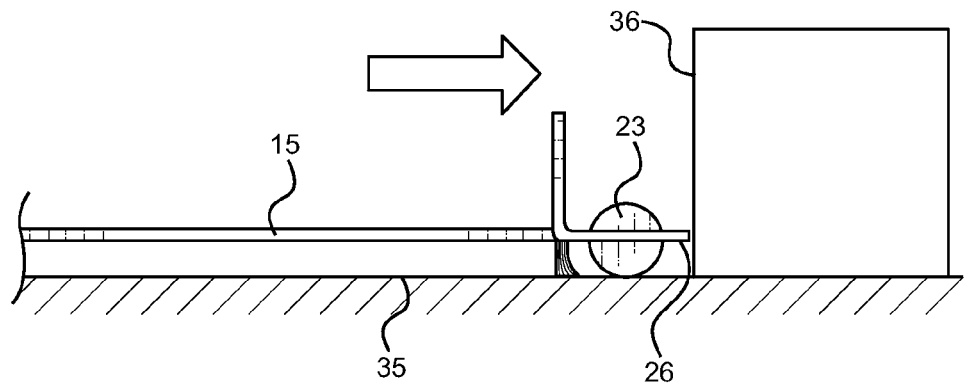
FIG. 4A shows a side view of the present invention in use to load cargo.
Figure 4B:
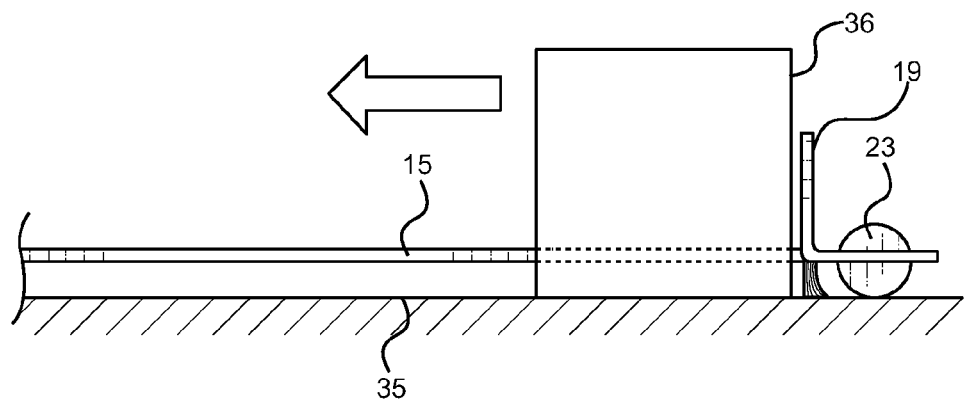
FIG. 4B shows a side view of the present invention in use to unload cargo.

Referring now to FIGS. 4A and 4B, there are shown views of the present invention to load and unload cargo. To load cargo 36 to a truck bed 35, the cargo 36 is placed in front of the cross bar so that the cargo 36 is in direct contact with the second section 26. The first section and second section 15 of the handle can then be pushed from the tailgate end to the front end of the truck bed 35. When the loading and unloading apparatus is pushed, the cross bar is rolled along the length of the truck bed 35 by means of caster wheels 23. Conversely, the cargo 36 can be unloaded from the truck bed 35 by placing the cross bar in front of the cargo 36 so that the first section 19 is in direct contact with the cargo 36. Thereafter, the first section and second section 15 of the handle is pulled towards the tailgate end and away from the front end of the truck bed 35. In this way, the cross bar is rolled towards the tailgate end of the truck bed 35 and the cargo 36 can be unloaded therefrom.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A loading and unloading apparatus for use with truck beds, comprising:
    a cross bar having a first section perpendicular to a second section, defining a leading edge at an intersection of said first section and said second section;
    wherein said first section is adapted to be disposed vertically;
    wherein said second section is adapted to be disposed horizontally;
    a plurality of wheels attached to said second section;
    bristles that span said leading edge;
    a telescopic handle attached to said first section;
    wherein said telescopic handle is parallel to said second section;
    wherein said second section comprises openings at opposing sides of said handle, a plate slideably attached to the second section at each of said openings, the plates each having a centrally located wheel opening and a channel on opposing sides of said wheel opening, one of said plurality of wheels rotatably attached to sides of each said wheel opening.

2. The loading and unloading apparatus of claim 1, further comprising:

a divider wall having a panel attached to a base member;
said base member having a hollow middle portion for receiving said telescopic handle therethrough.

3. The loading and unloading apparatus of claim 1, further comprising:
a divider wall having a panel attached to a base member;
said panel having an opening for receiving said telescopic handle therethrough.

4. The loading and unloading apparatus of claim 1, further comprising:
a locking mechanism disposed in said channel;
said locking mechanism attached to said second section at opposing sides of said opening;
wherein said locking mechanism can tighten to secure said plate in place, and wherein said locking mechanism can loosen to allow said plate to slide along said second section, whereby sliding said plate changes the location of said caster wheel along said second section.

5. The loading and unloading apparatus of claim 1, wherein said handle comprises a rectangular cross section.

6. The loading and unloading apparatus of claim 1, wherein said handle further comprises a gripping portion.

7. The loading and unloading apparatus of claim 1, wherein said handle comprises a first section and a second section;
wherein said second section of said handle is adapted to be slidably inserted into said first section of said handle such that the length of said handle can be adjusted;
wherein said second section of said handle is attached to said second section of said cross bar.

8. The loading and unloading apparatus of claim 7, wherein said first section of said handle comprises a first end having an aperture thereon;
said second section of said handle having a plurality of locking mechanisms at a longitudinal edge thereof;
said plurality of locking mechanisms spaced apart at regular intervals;
said aperture adapted to receive one of said plurality of locking mechanisms therethrough.

9. The loading and unloading apparatus of claim 8, wherein said plurality of locking mechanisms is spring biased.

* * * * *